3,381,004
NITROGEN-CONTAINING PREGNENES AND METHOD OF PREPARING THE SAME
Milton Heller and Seymour Bernstein, New City, N.Y., assignors to American Cyanamid Company, Stamford, Conn., a corporation of Maine
No Drawing. Filed Oct. 28, 1966, Ser. No. 592,128
8 Claims. (Cl. 260—239.55)

ABSTRACT OF THE DISCLOSURE

The preparation of 16,20-disubstituted (5)6-pregnenes from 3β-acetoxy-16α-hydroxypregna-5-en-20-one, is described. The present compounds are useful for their central nervous system depressant activity.

---

This invention relates to new steroid compounds and more particularly, the invention relates to new nitrogen-containing pregnenes.

The novel compounds of this invention may be represented by the following general formula:

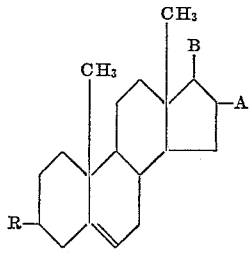

wherein R is selected from the group consisting of amino, dilower-alkylamino and azido; A is selected from the group consisting of amino and azido; B is selected from the group consisting of

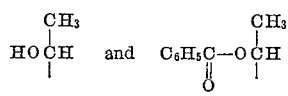

and A taken together with B is

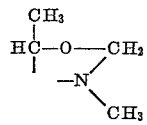

The novel compounds of this invention, in general, are crystalline solids having clearly defined melting points. The compounds generally are soluble in the common organic solvents, as for example, ethanol, acetone, petroleum ether, and the like. The compounds are relatively insoluble in water.

The preparation of the novel compounds is illustrated schematically in the following flowsheet. The preparation of the starting compound, 3β-acetoxy-16β-azidopregn-5-en-20β-ol, is described in Example 1, hereinafter.

FLOWSHEET

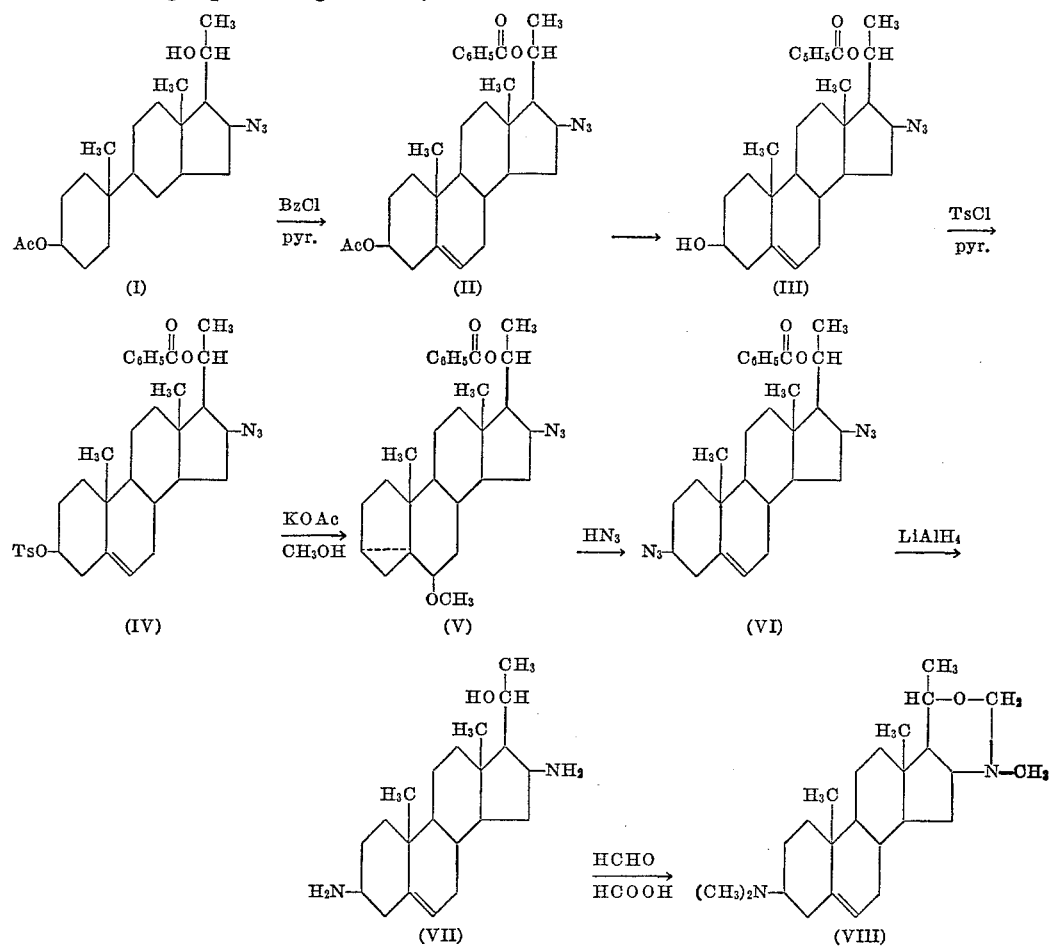

In the above flowsheet, the compound 3β-acetoxy-16β-azidopregn-5-en-20β-ol (I) is prepared starting with 3β-acetoxy-16α-hydroxypregn-5-en-20-one [J. Org. Chem. 19, 131 (1954)] which is reacted with methanesulfonyl chloride to produce the corresponding 16α-methanesulfonate which is treated with sodium borohydride in absolute ethanol to produce 3β-acetoxy-16α-methanesulfonyloxy-pregn-5-en-20β-ol. The latter compound is treated with sodium azide, N-methyl-2-pyrrolidone and t-butyl alcohol to produce 3β-acetoxy-16β-azidopregn-5-en-20β-ol (I) which on treatment with benzoyl chloride, produces 16β-azidopregn-5-ene-3β,20β-diol 3-acetate 20-benzoate (II). When the latter acetoxy benzoate is reacted with methylene chloride and potassium hydroxide in a lower alkanol, the product 16β-azido-20β-benzoyloxypregn-5-en-3β-ol (III) is obtained. On treatment of the benzoate compound (III) with p-toluenesulfonyl chloride in pyridine, 16β-azidopregn-5-ene-3β,20β-diol 3-p-toluenesulfonate 20-benzoate (IV) is produced. The latter tosylate-benzoate on heating with potassium acetate in methylene chloride and a lower alkanol, gives 16β-azido-6β-methoxy-3α,5α-cyclopregnan-20β-ol benzoate (V). When the latter cyclopregnane benzoate compound (V) is treated with hydrazoic acid and boron trifluoride etherate, the product 3β,16β-diazidopregn-5-en-20β-ol benzoate (VI) is obtained. Heating the latter diazidobenzoate compound with lithium aluminum hydride in tetrahydrofuran, produces 3β,16β-diaminopregn-5-en-20β-ol (VII). The latter compound (VII) on heating with formaldehyde and formic acid produce, 3′,6′-(R)-dimethyl-2′,3′,4′,5′-tetrahydro-1′-3′-oxazino[4′,5′:16β,17β]3β-dimethylaminoandrost-5-ene (VIII).

The novel compounds of the present invention possess central nervous system depressant activity. As such therefore, the compounds may be useful as therapeutic agents in the treatment of a variety of central nervous system disorders.

The invention is described in more detail in conjunction with the following examples.

Example 1.—Preparation of 16β-azidopregn-5-ene-3β,20β-diol 3-acetate 20-benzoate (II)

Treatment of a solution containing 1 g. of 3β-acetoxy-16α-hydroxypregn-5-en-20-one [prepared according to J. Org. Chem. 19, 131 (1954)], in 5 ml. of pyridine with methanesulfonyl chloride (2 ml.) at −5° C. gives, after crystallization of the product from an acetone-water mixture, the corresponding 3β-acetoxy-16α-methanesulfonyl-oxypregn-5-en-20-one; 1.005 g., melting point 159–160.5° C.

A mixture of 5.2 g. of the methanesulfonate-20-one prepared above and 5.0 g. of sodium borohydride in absolute ethanol (780 ml.) is stirred at room temperature for 75 minutes, whereupon complete solution is effected. The solution is added to ice-water and the resultant precipitate (3.48 g.) is crystallized from dilute methanol to give 3β-acetoxy-16α-methanesulfonyloxypregn-5-en-20β-ol, melting point 158.5–159° C. Crystallization from a mixture of acetone-hexane gives an analytical sample, melting point 161.5–167° C.

A mixture of the methanesulfonate compound (0.57 g.), prepared above, and sodium azide (0.45 g.) in 23.75 ml. of N-methyl-2-pyrrolidone and 1.25 ml. of t-butyl alcohol is heated on the steam bath for 28 hours. Water is added and the resultant amorphous brown solid (0.495 g.) is collected. Crystallization from a mixture of acetone-petroleum ether (boiling range 60–70° C.) yields 3β-acetoxy-16β-azidopregn-5-en-20β-ol (0.215 g.), melting point 186.5–187° C.

To an ice-cold solution of 3β-acetoxy-16β-azidopregn-5-en-20β-ol, prepared above (3.49) in pyridine (15 ml.) is added benzoyl chloride (2 ml.). The mixture is allowed to stand 18 hours at room temperature and then is poured into ice-water. The resultant precipitate is collected and dissolved in methylene chloride and the organic solution is washed with dilute sodium hydroxide solution. Removal of the solvent under reduced pressure and crystallization from acetone-hexane affords the desired product (II) (3.6 g.), melting point 173.5–174.5° C. The analytical sample melts at 174.5–175° C.

Example 2.—Preparation of 16β-azido-20β-benzoyloxy-pregn-5-en-3β-ol (III)

To an ice-cold solution of acetoxy benzoate (II) (3.2 g.) in methanol (15 ml.) and methylene chloride (15 ml.) is added 8 ml. of a 5% solution of potassium hydroxide in methanol. The solution is allowed to stand 17 hours at +5° C., acetic acid is added to neutralize the solution, and the solution is poured into an excess of water and extracted with methylene chloride. Removal of the solvent under reduced pressure and crystallization of the residue from methanol gives the desired product (III), melting point 122–130° C. The analytical sample after being dried over benzene melts at 122.5–126° C.

Example 3.—Preparation of 16β-azidopregn-5-ene-3β,20β-diol 3-p-toluenesulfonate 20-benzoate (IV)

A solution of the benzoate compound (III) (6.4 g.) and p-toluenesulfonyl chloride (6 g.) in 45 ml. of pyridine is allowed to stand at room temperature for 20 hours, and then poured into ice-water. The resultant precipitate is crystallized from methylene chloride to give the desired product (IV), melting point 179.5–180.5° C.

Example 4.—Preparation of 16β-azido-6β-methoxy-3α,5α-cyclopregnan-20β-ol benzoate (V)

A mixture of the tosylate-benzoate compound (IV) (6.29 g.) and potassium acetate (12.5 g., oven dried) in methylene chloride (100 ml.) and methanol (1 l.) is refluxed 22 hours whereupon complete solution results. Most of the solvent is removed under reduced pressure, and the remainder of the solution is added to ice-water. The amorphous solid results, which cannot be crystallized, containing three components (one major and two minor) as determined by thin layer chromatography. Chromatography on activated magnesium silicate (500 g.) gives the desired compound (V), as an oil (4.5 g.).

Example 5.—Preparation of 3β,16β-diazidopregn-5-en-20β-ol benzoate (VI)

A solution of the cyclopregnane benzoate compound (V) (4.50 g.) in benzene (100 ml.) containing hydrazoic acid (prepared from 26 g. of sodium azide; see Organic Reactions, Editors, Adams et al., John Wiley & Sons, New York, vol. III, p. 327) and freshly distilled boron trifluoride etherate (3.1 ml.) is allowed to stand 3.5 hours at room temperature. There is then added to the reaction mixture 6 N ammonium hydroxide (150 ml.) followed by ether (200 ml.). The organic layer is collected, washed with 6 N ammonium hydroxide and water, and dried over magnesium sulfate. Removal of the solvent gives an oil which solidifies on standing. Crystallization from acetone-hexane yields VI (3.65 g.), melting point 146–148° C. The analytical sample melts at 155.5–156.5° C.

Example 6.—Preparation of 3β,16β-diaminopregn-5-en-20β-ol (VII)

A mixture of the diazido-benzoate compound (VI) (2.77 g.) and lithium aluminum hydride (4.0 g.) in 150 ml. of tetrahydrofuran is refluxed for 17 hours. A saturated solution of sodium and potassium tartrate is added dropwise to the cold mixture until all the lithium aluminum hydride is reacted. The mixture is then filtered. The residue is heated in additional tetrahydrofuran and again filtered. The combined filtrates are evaporated to dryness leaving a residue. The residue is dissolved in methanol, and concentrated with heating to give a precipitate of an unknown (ca. 0.25 g.), melting point 234–236° C. Addition of ethyl acetate to the filtrate and concentration gives the desired compound VII (0.75 g.), melting point 214–219° C.

Example 7.—Preparation of 3',6'(R)-dimethyl-2',3',4',5'-tetrahydro - 1',3' - oxazino[4',5':16β,17β] - 3β - dimethylaminoandrost-5-ene (VIII)

A solution of the diamino-20β-ol compound (VII) (0.59 g.) in a mixture of 10 ml. of formaldehyde and 10 ml. of formic acid is refluxed for 7 hours. The reaction mixture is poured into ice-water, made basic with dilute potassium hydroxide, and the resultant precipitate is collected. Crystallization from acetone-water gives the desired product (VIII) (0.31 g.), melting point 126.5–127° C. The analytical sample melts at 127.5–128.5° C.

We claim:
1. A pregnene of the formula:

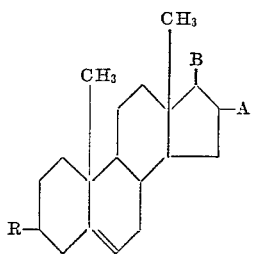

wherein R is selected from the group consisting of amino, dilower-alkylamino and azido; A is selected from the group consisting of amino and azido; B is selected from the group consisting of

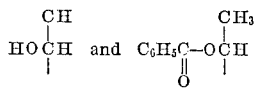

2. The pregnene in accordance with claim 1: 16β-azidopregn-5-ene-3β,20β-diol 3-acetate 20-benzoate.

3. The pregnene in accordance with claim 1: 16β-azido-20β-benzoyloxypregn-5-en-3β-ol.

4. The pregnene in accordance with claim 1: 16β-azidopregn-5-ene-3β,20β-diol 3-p-toluenesulfonate 20-benzoate.

5. The pregnene in accordance with claim 1: 3β,16β-diazidopregn-5-en-20β-ol benzoate.

6. The pregnene in accordance with claim 1: 3β,16β-diaminopregn-5-en-20β-ol.

7. The pregnene in accordance with claim 1: 3',6'-(R) - dimethyl - 2',3',4',5' - tetrahydro - 1',3' - oxazino [4',5':16β-17β]-3β-dimethylaminoandrost-5-ene.

8. A method of preparing 3β,16β-diamino-pregn-5-en-20β-ol which comprises heating 3β,16β-diazino-pregn-5-en-20β-ol benzoate with lithium aluminum hydride in a solvent.

References Cited

Nussbaum et al.: Journal American Chem. Soc., June 5, 1965, pages 2451–2456.

ELBERT L. ROBERTS, *Primary Examiner.*